Patented June 15, 1943

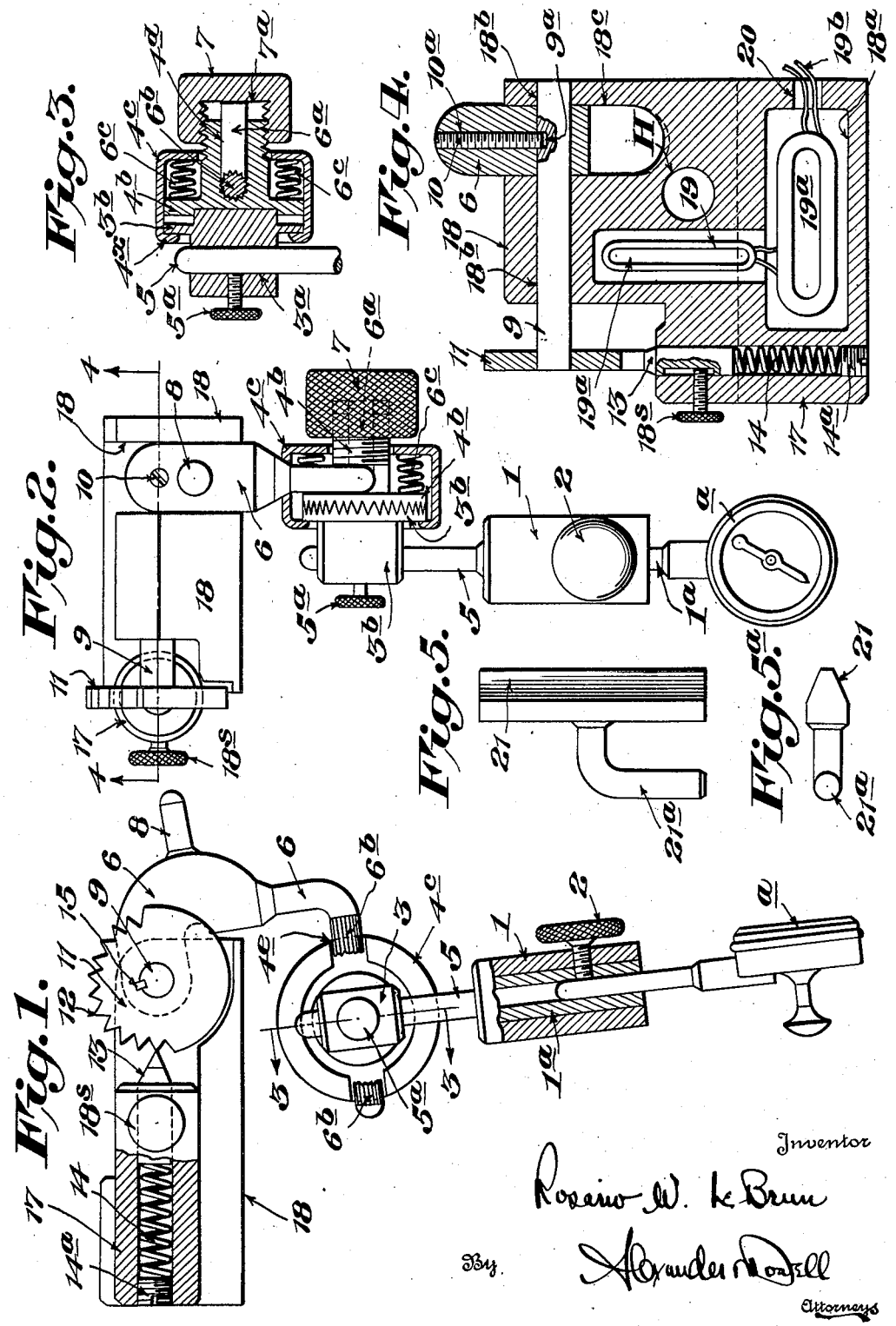

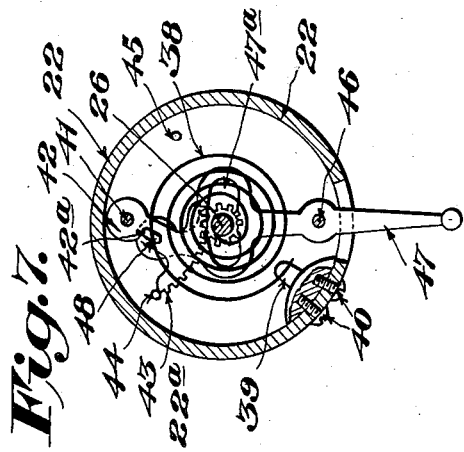

2,322,033

UNITED STATES PATENT OFFICE 2,322,033

DIAL INDICATOR ATTACHMENT

Rosario W. Le Brun, Waterloo, N. Y.

Application August 24, 1942, Serial No. 455,933

17 Claims. (Cl. 33—172)

This invention is a novel dial indicator attachment particularly adapted for use in connection with milling, grinding, or other machines, the attachment consisting of a base carrying electromagnets adapted to be plugged across the usual electric power leads to energize the magnets whereby the attachment may be conveniently and magnetically mounted upon the metallic portions of said machines in various desired locations and positions without necessitating the use of screws, bolts or other extraneous securing means for so mounting the base on the machine.

Another object of the invention is to provide a novel dial indicator attachment consisting essentially of a base having an arm mounted thereon adjustably swingable on a horizontal axis, said arm being U-shaped and having adjustably secured to its outer end a second arm also swingable on a horizontal axis, the second arm being adapted to carry a dial for engaging the work operated upon by the machine, or being adapted to carry a straight edge, or other marking or indicating device, said arms being adapted to be swung and secured in position to bring the dial or straight edge into engagement with the work, thereby dispensing with the necessity of having to remove the work from the machine or to use extraneous instruments in checking the dimensions or the like of the work.

Further objects of the invention are to provide a dial indicating attachment having a magnetizable base whereby the same may be used for truing or checking work in machines in which other dial standards cannot be used, the base in my attachment being mountable directly upon the plates of the machine, such as surface plates, or on tables used for inspecting and laying out work, as well as in locations where bolts and clamps cannot be used, to provide a ready means for checking spindle beds, etc., in locations in machines where the usual dial indicator standard cannot be fastened, thereby avoiding the necessity of having to take the work from one machine and check same in another machine before finishing the operation on the work in the first machine; to provide an attachment which can be hung from the underside of ways or jibs of various types of machines; to provide an attachment which can be used as a stop at the end of the machine against which the tail stock may contact; to provide an attachment in which a sine bar may be held therein when the dial is removed to determine angles such as faces of beveled gears or the like; also to provide an attachment which may be used for any other purposes for which same is adaptable.

I will explain the invention with reference to the accompanying drawings, which illustrate several practical embodiments thereof to enable others to adopt and use the same; and will summarize in the claims, the novel features of construction, and novel combinations of parts, for which protection is desired.

In said drawings:

Fig. 1 is a side elevation, partly in section, showing the attachment carrying a dial, and having its base adapted to be magnetically secured to a horizontal metallic support.

Fig. 2 is a front elevation of the parts shown in Fig. 1.

Fig. 3 is a transverse section on the line 3—3, Fig. 1.

Fig. 4 is a transverse section through the base on the line 4—4, Fig. 2.

Fig. 5 is a top plan view of the straight edge adapted to be mounted in the attachment.

Fig. 5a is a side elevation of the straight edge shown in Fig. 5.

Fig. 6 is a side elevation, partly in section, showing the attachment adapted for mounting on a vertical support and showing the arms swung into position to hold the dial in a substantially horizonal position.

Fig. 7 is a transverse section on the line 7—7, Fig. 6.

Fig. 8 is a front elevation showing the face of the dial and the pointer, shown in Fig. 6.

Fig. 9 is a rear elevation of the dial shown in Fig. 6.

As shown, my novel dial indicator attachment comprises a base 18 having internal recesses 18A therein adapted to receive electro-magnetic coils 19 mounted upon cores 19A, said coils having conductor wires 19B extending to a plug (not shown) whereby the same may be connected across ordinary power or lighting leads to energize the coils 19 and thereby cause the base 18 to be magnetically secured in position upon a vertically, horizontally or angularly disposed steel or other plate of a milling, grinding or other machine in connection with which the attachment is to be used, the use of electro-magnetics 19—19A thereby obviating the necessity of having to bolt or otherwise fasten the base 18 to the machine and providing a construction in which the base may be held against the side of a machine, or suspended from underneath the ways or arm of the machine, or mounted on top of a cover with the dial swung down underneath and contacting the work, thereby indicating the characteristics of the work as it revolves, turns or travels or a stop.

Extending through base 18 is a bore 18B in which a shaft 9 is journaled, said shaft projecting beyond one side of the base and carrying a ratchet wheel 11. Base 18 is further provided with an open recess 18C crossing bore 18B, said recess snugly receiving an arm 6 fixedly mounted on shaft 9, for rotation therewith, arms 6 having a tapped bore 19A for a set screw 19 having its pointed inner end engaging a correspondingly shaped depression 9A in shaft 9, screw 19 thus also maintaining shaft 9 against axial movement in bore 18B.

Arm 6 carries a handle 8 whereby the same and also the shaft 9 may be manually rotated into various angular adjustments with respect to base 18. Ratchet wheel 11 is fixedly mounted on shaft 9, such as by key 15, and is provided with peripheral ratchet teeth 12 adapted to cooperate with a spring-pressed pawl 13 which is slidably mounted in a bore in a lateral extension 17 of base 18 opposite ratchet wheel 11, said bore housing a spring 14 (Fig. 4) engaging the inner end of pawl 13, the opposite end of the spring engaging a fixed plug 14a threaded into the opposite end of the bore, whereby spring 14 will normally yieldably urge pawl 13 into engagement with ratchet teeth 12. Tapped through the side of extension 17 and opposite the rear portion of pawl 13 is a thumb screw 18S adapted to firmly engage pawl 13 and thereby hold same from movement, whereby shaft 9 and arm 6 may be securely held in adjusted angular position.

Arm 6 is preferably U-shaped and has a leg 6B adapted to swing below base 18, said leg being knurled or fluted for substantially its full length as indicated in Figs. 1 and 3. Upon leg 6B is a disk-like member 4B having a serrated outer face and having a tubular extension on its rear face exteriorly threaded and provided with a slot 4D receiving the leg 6B at its inner end, a cylindrical plug 6A being disposed within the bore of extension and having its inner end concaved and fluted to correspond with the fluting on leg 6B, the opposite end of plug 6A terminating within said bore. Threaded on the extension of member 4B is a nut 7 having a centrally disposed internal bearing portion 7A engaging the outer end of plug 6A, whereby as the nut 7 is screwed inwardly of the extension the projection 7A will urge plug 6A inwardly and thereby rigidly lock the member 4B in adjusted position on leg 6B; and thus the member 4B may be adjusted longitudinally of leg 6B as well as angularly thereof.

Cooperating with the serrated outer face of the member 4B is an adjustable disk 3B having serrations engaging those of the member 4B, said disk having a bore 3A adapted to receive the reduced shank 5 of a sleeve 1, which shank is maintained in bore 3A by means of a thumb screw 5A. Member 4B and disk 3B are yieldably maintained in engagement by means of a cup-shaped member 4C having a central hole in its base slidably engaging the tubular extension of member 4B and having an inturned flange 4X at its outer end engaging the rear face of disk 3B, springs 6C being interposed between the rear face of member 4B and the base of cup-shaped member 4C for normally yieldably urging the serrations of the disks 3B, 4B into engagement while permitting the member 4C to yield when effecting adjustment of the angularity between sleeve 1 and arm 6.

Sleeve 1 is provided with interchangeable bore linings 1A of various internal diameters in order to receive different sizes of shanks of dials, straight edges, sine bars, or the like, the linings 1A being maintained in the bore of the sleeve 1 by means of a thumb screw 2 tapped through the side of sleeve 1 and entering a hole in the wall of the lining, thumb screw 2 also engaging the shank A' of the standard dial A or the like as shown in Figs. 1 and 2. The lining 1A may be omitted and the shank 21A of a straight edge 21 may be inserted in and secured in the sleeve 1, said straight edge being shown in Figs. 5 and 5A.

In place of the dial A, or straight edge 21, a special dial may be inserted in the sleeve 1, said dial being illustrated more particularly in Figs. 6, 7, 8 and 9, and having a lever adapted to be engaged by a moving table or other part of the machine, or by the work thereon.

As shown in Figs. 6 and 9, said dial comprises a cup-shaped casing 22 having a closed base 22A and an open front and having a split chuck 22B extending rearwardly of the base, said chuck having a conical outer wall and being adapted to receive the end of a support 23 (Fig. 6) which has one end engaged in the sleeve 1 and its opposite end engaged in the split chuck 22B. The base of the split chuck adjacent the base 22A of the casing 22 is threaded exteriorly as at 22C and a nut 24 is mounted upon the threaded portion of the split chuck, the same having a conical extension 24A engaging the split chuck 22B whereby as the nut is tightened the split chuck 22B will be contracted around the supporting rod 23 and hold the same in adjusted position.

Within the casing 22 at the base thereof is a recess receiving a ball bearing 25 in which one end of a shaft 26 is journaled, the opposite end of the shaft being journaled in ball bearing 27 mounted in a housing 28 carried by a plate 29 seated in a shoulder formed by an internal annular recess in the outer end of the casing 22, said housing 28 having an opening disposed coaxially of shaft 26, which shaft carries a gear 30. The outer end of the shaft 26 opposite the opening in the housing 28 has a non-circular bore adapted to receive the shank 31 of a pointer 32 whereby as the shaft 26 is rotated the pointer 32 will be correspondingly rotated. Within the outer end of casing 22 spaced from the plate 29 by a ring 33 is a graduated dial plate, as indicated in Fig. 8, and in the outer end of the casing 22 is a transparent cover 35 spaced from the dial plate 34 by a ring 36. A ferrule 37 having an internal annular flange at its outer end is secured exteriorly of casing 22 by threads or the like, said ferrule holding the members 29, 34 and 35 in place by means of the spacing collars 33 and 36, the pointer 32 moving in the space between the dial plate 34 and the transparent closure 35.

The shaft 26 is normally urged to rotate in one direction by means of a coiled spring 38 having one end fixed to the shaft 26 and its opposite end secured in a post 39 (Fig. 7) which is mounted on the wall of casing 22 by means of screws 40.

Within casing 22 parallel with but offset from the shaft 26 is a rock shaft 41 having its ends journaled in the base 22A of the casing and in the plate 29, said shaft having an arm 42 thereon carrying a gear segment 43 in constant mesh with gear 30 on shaft 26. Stop pins 44 and 45 engage the ends of segment 43 to control the swinging movement of the arm 42, and when the segment engages stop 44 as shown in Fig. 7 the pointer 32 will lie opposite the zero graduation of the dial 34 owing to the action of the spring 38, the other stop 45 (Fig. 7) limiting the movement of the pointer in a clockwise direction, but permitting the pointer 32 to make one complete revolution.

Within casing 22 at the side opposite from rock shaft 41 is a shaft 46 upon which is mounted a ball lever 47 having a slot 47A receiving the pointer shaft 26, the inner end of lever 47 extending beside the arm 42 of the segmental gear 43 and carrying on its inner end a lateral projecting pin 48 engaging an elongated slot 42A in the arm 42 whereby as the lever 47 is pivoted the arm 42 will be correspondingly rocked and the pointer 32 correspondingly rotated. When however the pressure on the lever 47 is removed the spring 38 will restore the pointer 32 to position overlying the zero mark of the dial 34, which dial may be graduated in any desired manner, for any desired purpose.

I do not limit my invention to the exact forms shown in the drawings, for obviously changes may be made therein within the scope of the claims.

I claim:

1. In an indicator attachment, a base; an arm pivoted thereon; means for maintaining the arm in adjusted position; an indicator carrying sleeve having a shank; means connecting the shank and arm whereby the sleeve may be adjusted axially and angularly with respect to the arm, said maintaining means comprising a ratchet on the pivot of said arm; a spring-pressed pawl normally yieldably engaged with the ratchet; and means for locking the pawl against movement.

2. In an indicator attachment, a base; an arm pivoted thereon; means for maintaining the arm in adjusted position; an indicator carrying sleeve having a shank; means connecting the shank and arm whereby the sleeve may be adjusted axially and angularly with respect to the arm, said connecting means comprising a pair of opposed serrated disks connected with the shank and arm respectively; and yieldable means for urging the serrated faces of the disks into engagement.

3. In an indicator attachment, a base; an arm pivoted thereon; means for maintaining the arm in adjusted position; an indicator carrying sleeve having a shank; means connecting the shank and arm whereby the sleeve may be adjusted axially and angularly with respect to the arm, said connecting means comprising a serrated disk having an exteriorly threaded tubular extension slotted at its inner end to receive the arm; a slidable plug in said extension engaging the arm; a nut threaded on said extension and having a bearing portion contacting said plug; a second opposed serrated disk mounted on the shank, and means yieldably maintaining the serrated faces of the disks in engagement while permitting relative rotation of said disks.

4. In an indicator attachment, a base; an arm pivoted thereon; means for maintaining the arm in adjusted position; an indicator carrying sleeve having a shank; means connecting the shank and arm whereby the sleeve may be adjusted axially and angularly with respect to the arm, said connecting means comprising a serrated disk having an exteriorly threaded tubular extension slotted at its inner end to receive the arm; a slidable plug in said extension engaging the arm; a nut threaded on said extension and having a bearing portion contacting said plug; a second opposed serrated disk mounted on the shank, a collar having internal flanges overlying the backs of said opposed disks; and yieldable members interposed between the flanges and disks for urging the serrated faces of the disks into engagement.

5. In an indicator attachment, a base; an arm pivoted thereon; means for maintaining the arm in adjusted position; an indicator carrying sleeve having a shank; means connecting the shank and arm whereby the sleeve may be adjusted axially and angularly with respect to the arm, said maintaining means comprising a ratchet on the pivot of said arm; a pawl slidably mounted in the base opposite the ratchet; means for yieldably urging the pawl into engagement with the ratchet; and means for locking the pawl against movement; said connecting means comprising a pair of opposed serrated disks connected with the shank and arm respectively; and yieldable means for maintaining the serrated disks in engagement.

6. In an indicator attachment, a base; an arm pivoted thereon; means for maintaining the arm in adjusted position; an indicator carrying sleeve having a shank; means connecting the shank and arm whereby the sleeve may be adjusted axially and angularly with respect to the arm, said connecting means comprising a serrated disk having an exteriorly threaded tubular extension slotted at its inner end to receive the arm; a slidable plug in said extension engaging the arm; a nut threaded on said extension and having a bearing portion contacting the said plug; said arm and adjacent end of the plug being fluted; a second opposed serrated disk mounted on the shank; and means yieldably maintaining the serrated faces of the disks in engagement while permitting relative rotation thereof.

7. In an indicator attachment, a base; an arm pivoted thereon; means for maintaining the arm in adjusted position; an indicator carrying sleeve having a shank; means connecting the shank and arm whereby the sleeve may be adjusted axially and angularly with respect to the arm, said connecting means comprising a serrated disk having an exteriorly threaded tubular extension slotted at its inner end to receive the arm; a slidable plug in said extension engaging the arm; a nut threaded on said extension and having a bearing portion contacting said plug; said arm and adjacent end of the plug being fluted; a second opposed serrated disk mounted on the shank; and a collar having internal flanges overlying the backs of said opposed disks; and yieldable members interposed between the flanges and disks for urging the serrated faces of the disks into engagement.

8. In an indicator attachment, a base, a U-shaped arm pivotally connected thereto at one end on a horizontal axis and adapted to be swung into such position that the outer end of the arm will underlie the base; means for maintaining the arm in adjusted position; and an indicator adjustably mounted on said arm.

9. In an attachment as set forth in claim 8, said maintaining means comprising a ratchet on the pivot of said arm; a spring-pressed pawl normally yieldably engaged with the ratchet; and means for locking the pawl against movement.

10. In an indicator attachment, a base, a U-shaped arm pivotally connected thereto at one end on a horizontal axis and adapted to be swung into such position that the outer end of the arm will underlie the base; means for maintaining the arm in adjusted position; an indicator carrying sleeve having a shank; means connecting the shank and the outer end portion of the arm whereby the sleeve may be adjusted axially and angularly with respect to the arm.

11. In an attachment as set forth in claim 10, said maintaining means comprising a ratchet on the pivot of said arm; a spring-pressed pawl normally yieldably engaged with the ratchet; and means for locking the pawl against movement.

12. In an attachment as set forth in claim 10, said connecting means comprising a pair of opposed serrated disks connected with the shank and arm respectively; and yieldable means for urging the serrated faces of the disks into engagement.

13. In an attachment as set forth in claim 10, said connecting means comprising a serrated disk having an exteriorly threaded tubular extension slotted at its inner end to receive the arm; a slidable plug in said extension engaging the arm; a nut threaded on said extension and having a bearing portion contacting said plug; a second opposed serrated disk mounted on the shank, and means yieldably maintaining the serrated faces of the disk in engagement while permitting relative rotation of said disks.

14. In an attachment as set forth in claim 10, said connecting means comprising a serrated disk having an exteriorly threaded tubular extension slotted at its inner end to receive the arm; a slidable plug in said extension engaging the arm; a nut threaded on said extension and having a bearing portion contacting said plug; a second opposed serrated disk mounted on the shank, a collar having internal flanges overlying the backs of said opposed disks; and yieldable members interposed between the flanges and disks for urging the serrated faces of disks into engagement.

15. In an attachment as set forth in claim 10, said maintaining means comprising a ratchet on the pivot of said arm; a pawl slidably mounted in the base opposite the ratchet; means for yieldably urging the pawl into engagement with the ratchet; means for locking the pawl against movement; and said connecting means comprising a pair of opposed serrated disks connected with the shank and arm respectively; and yieldable means for maintaining the serrated disks into engagement.

16. In an attachment as set forth in claim 10, said connecting means comprising a serrated disk having an exteriorly threaded tubular extension slotted at its inner end to receive the arm; a slidable plug in said extension engaging the arm; a nut threaded on said extension and having a bearing portion contacting the said plug; said arm and adjacent end of the plug being fluted; a second opposed serrated disk mounted on the shank; and means yieldably maintaining the serrated faces of the disks into engagement while permitting relative rotation thereof.

17. In an attachment as set forth in claim 10, said connecting means comprising a serrated disk having an exteriorly threaded tubular extension slotted at its inner end to receive the arm; a slidable plug in said extension engaging the arm; a nut threaded on said extension and having a bearing portion contacting said plug; said arm and adjacent end of the plug being fluted; a second opposed serrated disk mounted on the shank; and a collar having internal flanges overlying the backs of said opposed disks; and yieldable members interposed between the flanges and disks.

ROSARIO W. LE BRUN.